United States Patent
Pangan et al.

(10) Patent No.: US 9,374,415 B1
(45) Date of Patent: Jun. 21, 2016

(54) REMOTE PERIPHERAL CONTROLLER

(71) Applicant: The Boeing Company, Chicago, IL (US)

(72) Inventors: Ronald Pangan, Cerritos, CA (US); Andrew J. Meredith, Lakewood, CA (US)

(73) Assignee: The Boeing Company, Chicago, IL (US)

( * ) Notice: Subject to any disclaimer, the term of this patent is extended or adjusted under 35 U.S.C. 154(b) by 305 days.

(21) Appl. No.: 14/028,488

(22) Filed: Sep. 16, 2013

(51) Int. Cl.
*G06F 15/16* (2006.01)
*H04L 29/08* (2006.01)
*G06F 17/30* (2006.01)

(52) U.S. Cl.
CPC .......... *H04L 67/10* (2013.01); *G06F 17/30719* (2013.01)

(58) Field of Classification Search
CPC ............................... H04L 29/06; G06F 9/5027
See application file for complete search history.

(56) References Cited

U.S. PATENT DOCUMENTS

| | | | |
|---|---|---|---|
| 6,362,836 B1 * | 3/2002 | Shaw | H04L 29/06 709/207 |
| 8,180,905 B2 | 5/2012 | Schmieder et al. | |
| 2013/0073600 A1 * | 3/2013 | Jenkins | G06F 9/5027 709/201 |

* cited by examiner

*Primary Examiner* — Viet Vu
*Assistant Examiner* — Keyvan Emdadi
(74) *Attorney, Agent, or Firm* — McDonnell Boehnen Hulbert & Berghoff LLP

(57) ABSTRACT

A system and method for remote peripheral control are presented. Network access protocols are detected for accessing a network from a server device. An application program is activated on the server device in response to an application activation command from a peripheral device. The application program is interfaced with server application commands from the peripheral device using the network access protocols. A remote server interface control module is interfaced with the server device via the network access protocols. The application program on the server device is activated with the application activation command. The application program is controlled with the server application commands using the network access protocols, and a custom user interface configured to the application program is provided for a user to control the application program without configuring network access to the server device.

20 Claims, 4 Drawing Sheets

REMOTE PERIPHERAL CONTROLLER

GOVERNMENT RIGHTS

This invention was made with government support under contract number FA8614-08-D-2080 awarded by Department of Defense. The government has certain rights in this invention.

FIELD

Embodiments of the present disclosure relate generally to control of software applications, and more particularly relate to remote control of software applications.

BACKGROUND

It can be difficult and time consuming to access multiple application programs and computers by multiple users at the same time.

SUMMARY

A system and method for remote peripheral control are presented. Network access protocols are detected for accessing a network from a server device. An application program is activated on the server device in response to an application activation command from a peripheral device. The application program is interfaced with a plurality of server application commands from the peripheral device using the network access protocols. A remote server interface control module is interfaced with the server device via the network access protocols. The application program on the server device is activated with the application activation command. The application program is controlled with the server application commands using the network access protocols, and a custom user interface configured to the application program is provided for a user to control the application program without configuring network access to the server device.

In this manner, embodiments provide a means for switching between computers and application programs on a remote computer at a click of an activation tab and displaying a custom user interface for the users of the selected application programs.

In an embodiment, a remote peripheral control system comprises a remote server interface control module, and a customized server device interface module. The remote server interface control module is configured on a server device, and detects one or more network access protocols for accessing a network from the server device. The remote server interface control module further activates an application program on the server device in response to an application activation command from a peripheral device. The remote server interface control module further interfaces the application program with server application commands from the peripheral device using the network access protocols. The customized server device interface module is configured on the peripheral device, and interfaces with the remote server interface control module via the network access protocols. The customized server device interface module further activates the application program on the server device with the application activation command, and controls the application program with the server application commands using the network access protocols. The customized server device interface module further provides a custom user interface configured to the application program for a user to control the application program without configuring network access to the server device.

In another embodiment, a method for remote peripheral control, detects network access protocols for accessing a network from a server device, and activates an application program on the server device in response to an application activation command from a peripheral device. The method further interfaces the application program with server application commands from the peripheral device using the network access protocols, and interfaces with the server device via the network access protocols. The method further activates the application program on the server device with the application activation command, controls the application program with the server application commands using the network access protocols, and provides a custom user interface configured to the application program for a user to control the application program without configuring network access to the server device.

In a further embodiment, a non-transitory computer readable storage medium comprises computer-executable instructions for remote controlling peripheral. The computer-executable instructions detect network access protocols for accessing a network from a server device, and activate an application program on the server device in response to an application activation command from a peripheral device. The computer-executable instructions further interface the application program with server application commands from the peripheral device using the network access protocols, and interface with the server device via the network access protocols. The computer-executable instructions further activate the application program on the server device with the application activation command, control the application program with the server application commands using the network access protocols, and provide a custom user interface configured to the application program for a user to control the application program without configuring network access to the server device.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure. The drawings are not necessarily made to scale.

DETAILED DESCRIPTION

Figure 1:
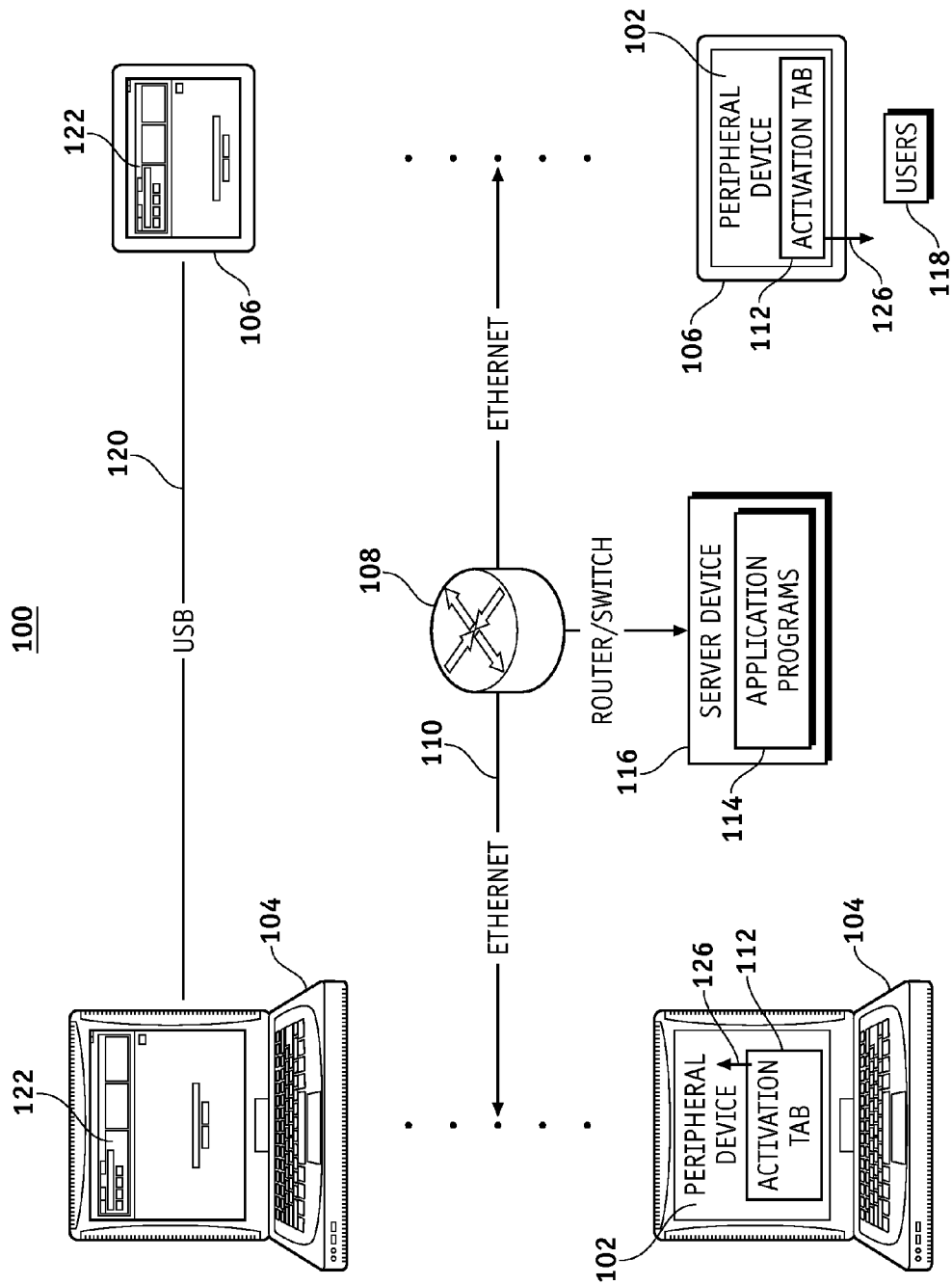
FIG. 1 is an illustration of a remote peripheral control system environment according to an embodiment of the disclosure.

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding technical field, background, brief summary or the following detailed description. The present disclosure should be accorded scope consistent with the claims, and not limited to the examples described and shown herein.

Embodiments of the disclosure are described herein in the context of one practical non-limiting application, namely, a desktop computer and a tablet computer. Embodiments of the disclosure, however, are not limited, and the techniques described herein may also be utilized in other applications requiring authentication. For example, embodiments may be applicable to, a laptop or notebook computer, an iPad™, an iPod™, a cell phone, a personal digital assistant (PDA), a mainframe, a server device, a router, an internet protocol (IP) node, a Wi-Fi node, a client device, or any other type of special or general purpose computing device as may be desirable or appropriate for a given application or environment.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

A remote computer, a remote device, and a client may be used interchangeably in this document. The remote computer may be defined herein as a computer that a user is using that is located remotely relative to a server where a program is located that the user is using via the remote computer. An application program may be defined herein as a computer software program. Examples of application program comprise, without limitation, accounting software, enterprise software, graphics software, media players, office suites, or other application.

Switching between application programs may comprise changing a remote representation on a remote peripheral device of a first application program from a first computer to a second application program from the first computer. Switching between remote computers may comprise changing a remote representation on a remote peripheral device of a first application program from a first computer to a second application from a second computer.

Embodiments of the disclosure provide a method for switching between computers and/or application programs on a remote computer at a click of an activation tab and displaying on the remote computer a custom user interface for the selected application program. Embodiments allow a user to perform the switching between the remote computers in one click rather than requiring several steps (e.g., physically disconnect from current desktop, connect to new one, open program, etc.). Thereby the user need not perform numerous steps necessary to configure multiple connections to multiple application programs on multiple computers.

Furthermore, an original application program on a remote computer that a user is interacting with may not be optimal for an end remote computer. For example, a user with a tablet computer may be accessing a second application program with small tabs that may not be optimally configured for the tablet computer. Because tablets are not generally configured to use small tabs. Embodiments detect the second application program and display a custom user interface over the application program making interaction with the second application program easier for the user.

Multiple application programs and remote computers may be accessed by multiple users at a substantially same time in a small confined area. Embodiments improve safety (e.g., fewer cables to trip on), efficiency (e.g., no need to physically switch between computers), and usability (e.g., custom user interfaces designed for the application programs).

FIG. 1 is an illustration of a remote peripheral control system environment 100 (environment 100) according to an embodiment of the disclosure. The environment 100 comprises a peripheral device 102, implemented on a remote computer 104/106, a router/switch 108, a communication channel 110, and an activation tab 112. Remote computer, client, and remote device may be used interchangeably in this document. Similarly, a communication link and a communication channel may be used interchangeably in this document.

Any number of remote devices 104/106 may be remotely coupled communicatively to each other via the communication channel 110 and operate independently. The remote computers 104/106 are switched via the application programs 114 using the router/switch 108 coupled to the remote computers 104/106, at an (one) activation (click) of the (one) activation tab 112 generating an activation signal 126 on the peripheral device 102 as explained in more detail below in the context of discussion of FIG. 2. In response to the activation signal 126 each of the remote computers 104/106 displays a custom user interface 122 for each of the application programs 114 selected by the activation tab 112 on the peripheral device 102 configured in the remote computer 104/106. The activation signal 126 may also be generated by, for example but without limitation, an activation button 426 (FIG. 4), or other activation means.

Depending on a type of the remote computer 104/106, switching between the remote computers 104/106 with the existing systems may take several steps (e.g., physically disconnect from current desktop, connect to a new desktop, open an application program, etc.). In contrast, the peripheral device 102 performs the switching between the remote computers 104/106 in response to only one click activating the activation tab 112.

As mentioned above an original application program among the application programs 114 that the user(s) 118 is interacting with on a remote device such as the remote device 104 (desktop computer) may not be optimal for an end remote device such as the remote device 106 (tablet computer). For example, a user with a tablet computer may be accessing a (second) application program with small tabs which may not be optimally configured for the tablet computer. Tablet computers are not generally configured to use small tabs.

The peripheral device 102 detects the (second) application program 114 configured with small tabs and displays the custom user interface 122 over a second application program from among the application programs 114 making the remote device 106 (tablet computer) easier for the user 118 to interact with.

Each activation tab 112 is configured for a respective application program 114. Multiple activation tabs such as that application tab 112 may be configured for each of the application programs 114 respectively. Multiple application programs 114 and remote computer(s) 104/106 may be accessed by multiple users 118 at substantially the same time, for example, in a small confined area. Embodiments improve safety (e.g., fewer cables to cause obstruction), efficiency (e.g., no need to physically switch between computers), and usability (e.g., custom interfaces designed for the application program/software).

Any number of peripheral devices 102 running any number of application programs 114 may be used on any number of the remote computers 104/106. The number of the application programs 114 that peripheral devices 102 can run depends on processing power of the server device 116. A number of the remote computers 104/106 and the peripheral devices 102 may be determined by a bandwidth of the communication channel 110 that the router/switch 108 can support.

Figure 2:
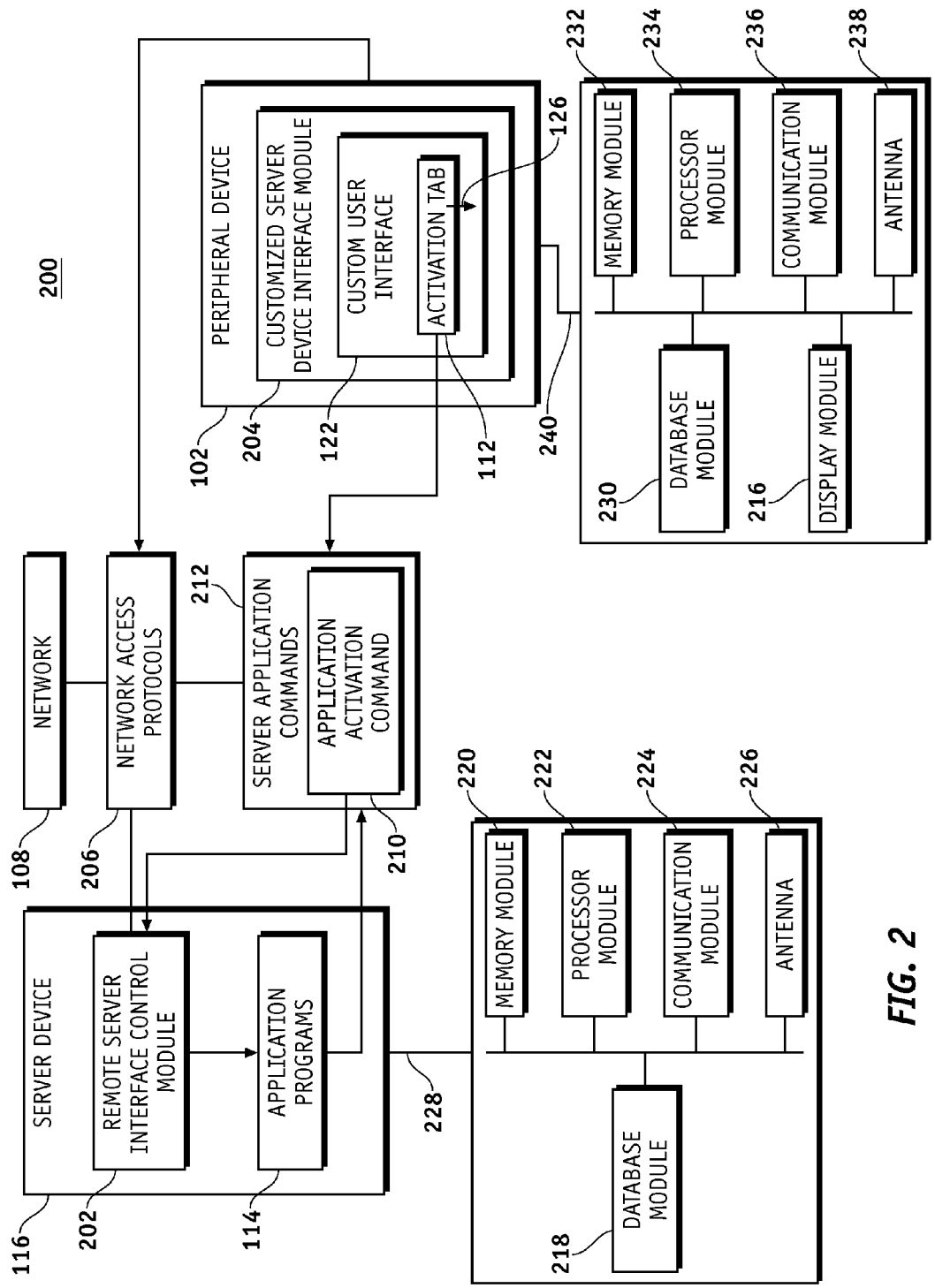
FIG. 2 is an illustration of an exemplary functional block diagram of a remote peripheral control system according to an embodiment of the disclosure.

FIG. 2 is an illustration of an exemplary functional block diagram of a remote peripheral control system 200 (system 200) according to an embodiment of the disclosure. The system 200 may comprise a remote server interface control module 202 on the server device 116, a customized server device interface module 204 on the peripheral device 102, a display module 216, a processor module 222/234, a memory module 220/232, and a communication module 224/236.

The remote server interface control module 202 is configured on the server device 116 by one activation of one activation tab 112, and detects one or more network access protocols 206 for accessing the network 108 from the server device 116. The remote server interface control module 202 also activates at least one application program from among the application programs 114 on the server device 116 in response to an application activation command 210 from the peripheral device 102. The remote server interface control module 202 further interfaces the application programs 114 with server application commands 212 from the peripheral device 102 using the network access protocols 206.

The customized server device interface module 204 is configured on the peripheral device 102 to interface with the remote server interface control module 202 via the network access protocols 206, activate the application program 114 on the server device 116 with the application activation command 210, control the application program 114 with the server application commands 212 using the network access protocols 206, and provide the custom user interface 122 configured to the application program 114 for each of the users 118 to control the application programs 114 without configuring network access to the server device 116.

The network access protocols 206 may comprise, for example but without limitation, User Datagram Protocol (UDP), Transmission Control Protocol (TCP), Ethernet access protocol, internet access protocol, address resolution protocol (ARP), neighbor discovery protocol (NDP), point to point protocol (PPP), tunneling protocol, open short path first (OSPF) protocol, media access protocols of link layer, or other network access protocol suitable for operation of the system 200.

The custom user interface 122 is configured to detect an activation signal 126 in response to the activation of the activation tab 112. In response to the activation signal 126, the peripheral device 102 detects the application activation command 210 to be sent over the network 108 to the server device 116 running the application programs 114.

In response to "one click" of the activation tab 112, the system 200 changes the server device 116 that the remote device 104/106 is plugged in to, and changes a foreground application program on the remote computer 104/106 to a selected application program 114 from among the application programs 114 that the activation tab 112 is configured for.

In operation, the user 118 presses/activates the activation tab 112, generating the activation signal 126. In response to the activation signal 126, a connection to the server device 116 is initiated, a new remote session to the server device 116 is created, and a remote session is added to an active remote session list. The custom user interface 122 is then loaded (loading the custom user interface 122) based on the application program 114 configured for the activation tab 112. The application activation command 210 is sent to the server device 116 to activate the application program 114 remotely, and the custom user interface 122 displayed on the remote desktop 104/106 is changed to the selected application program 114 running on the server device 116 remotely.

The custom user interface 122 may comprise, for example but without limitation, a remote desktop, a remote laptop or notebook computer, a remote tablet computer, a remote iPad™, a remote iPod™, a cell phone, a personal digital assistant (PDA), a remote mainframe, a remote server, a remote router, a remote client device, or any other type of special or general purpose computing device as may be desirable or appropriate for a given application or environment. The custom user interface 122 may be configured by the selected application program 114.

The display module 216 is operable to present the custom user interface 122 to the user(s) 118. The display module 216 may use a technology such as, but without limitation, a liquid crystal display (LCD), an organic electro-luminescence (OEL), an organic light emitting diode (OLED), an organic electro luminescent device (OELD), an electronic ink, or other display technology. Various kinds of information can be displayed on a display screen via an image/video signal supplied from a processor module 234. The display module 216 may also comprise user input means (not shown) to receive user input (a key pad, a touchpad, a voice input, etc.).

The database module 218/230 may be configured to store, maintain, and provide data as needed to support the functionality of the system 200 in the manner described below. For example, the database module 218 is configured to store the application programs 114 in a non-transitory storage medium. For another example, the database module 230 is configured to store the custom user interface 122, the activation signal 126, the application activation command 210, and other data in a non-transitory storage medium. The database module 218/230 may comprise a lookup table for purposes of storing the data. Moreover, the database module 218/230 may be, for example but without limitation, a local database locally coupled to the processor module 222/234 respectively, a remote database such as a central network database remotely coupled to processor module 222/234 other storage source, or a combination thereof. The database module 218/230 may be comprised in the memory module 220/232 respectively.

The memory module 220/232, may be realized as a non-volatile storage device (non-volatile semiconductor memory, hard disk device, optical disk device, and the like), a random access storage device (for example, SRAM, DRAM), or any other form of storage medium known in the art. The memory module 220/232 may be coupled to the processor module 222/234 that can read information from, and write information to the memory module 220/232 respectively.

The processor module 222/234 can control overall operation of the system 200. For example, the processor module 222/234 may control operations of the system 200 so that processes of the system 200 are suitably performed. Processes of the system 200 may be suitably performed such that various processes are performed by proper procedures in response to an input from a user or automatically.

These processes may comprise, for example but without limitation, directing the peripheral device 102 to send the application activation command 210 to the server device 116, controlling a communication of the communication module 224/236 respectively controlling the display module 216 to display the custom user interface 122, or other process suitable for operation of the system 200.

The processor module 222/234, may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or other software or hardware machines.

A processor may also be implemented as a combination of computing devices, e.g., a combination of a digital signal processor and a microprocessor, a plurality of microprocessors, one or more microprocessors in conjunction with a digital signal processor core, or any other such configuration. The processor module 222/234 comprises processing logic that is configured to carry out the functions, techniques, and processing tasks associated with the operation of the system 200.

In particular, the processing logic is configured to support the method of the system 200 described herein. Furthermore, the steps of a method or algorithm described in connection with the embodiments disclosed herein may be embodied directly in hardware, in firmware, in a software module executed by the processor module 222/234 or in any combination thereof.

As an example, the processor module 222/234 and memory module 220/232 may reside in their respective ASICs. The memory module 220/232 may also be integrated into the processor module 222/234 respectively. In an embodiment, the memory module 220/232 may include a cache memory for storing temporary variables or other intermediate information during execution of instructions to be executed by the processor module 222/234. The memory module 220/232 may also include non-volatile memory for storing instructions to be executed by the processor module 222/234.

The communication module 224/236 is operable to transmit and receive a plurality of communication signals comprising data signals via a transceiver (not shown) under control of the processor module 222/234 respectively. The communication module 224/236 operates with an antenna 226/238 to carry out a radio communication with the network 108. The communication module 224/238 can transmit a signal from the processor module 222/234 as a transmitted radio signal to a base station through the antenna 226/238 respectively, and can demodulate a received radio signal received from the base station through the antenna 226/238. The processor module 222/234 receives a demodulated signal form the communication module 224/236 respectively.

The communication module 224/236 may also comprise an Ethernet/USB communication module (not shown) configured to provide communication between the system 200 and the remote device 104 (remote computer 104) via the communication channel 110. The Ethernet/USB communication module communicates with the Internet through an access port 120 to download documents, and to interact with Web-based services.

The various illustrative blocks, modules, processing logic, and circuits described in connection with the system 200 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein.

The illustrated system 200 depicts a simple embodiment for ease of description. These and other elements of the system 200 are interconnected together, allowing communication between the various elements of the system 200. In one embodiment, these and other elements of the system 200 may be interconnected together via a data communication bus 228/240.

Figure 3:
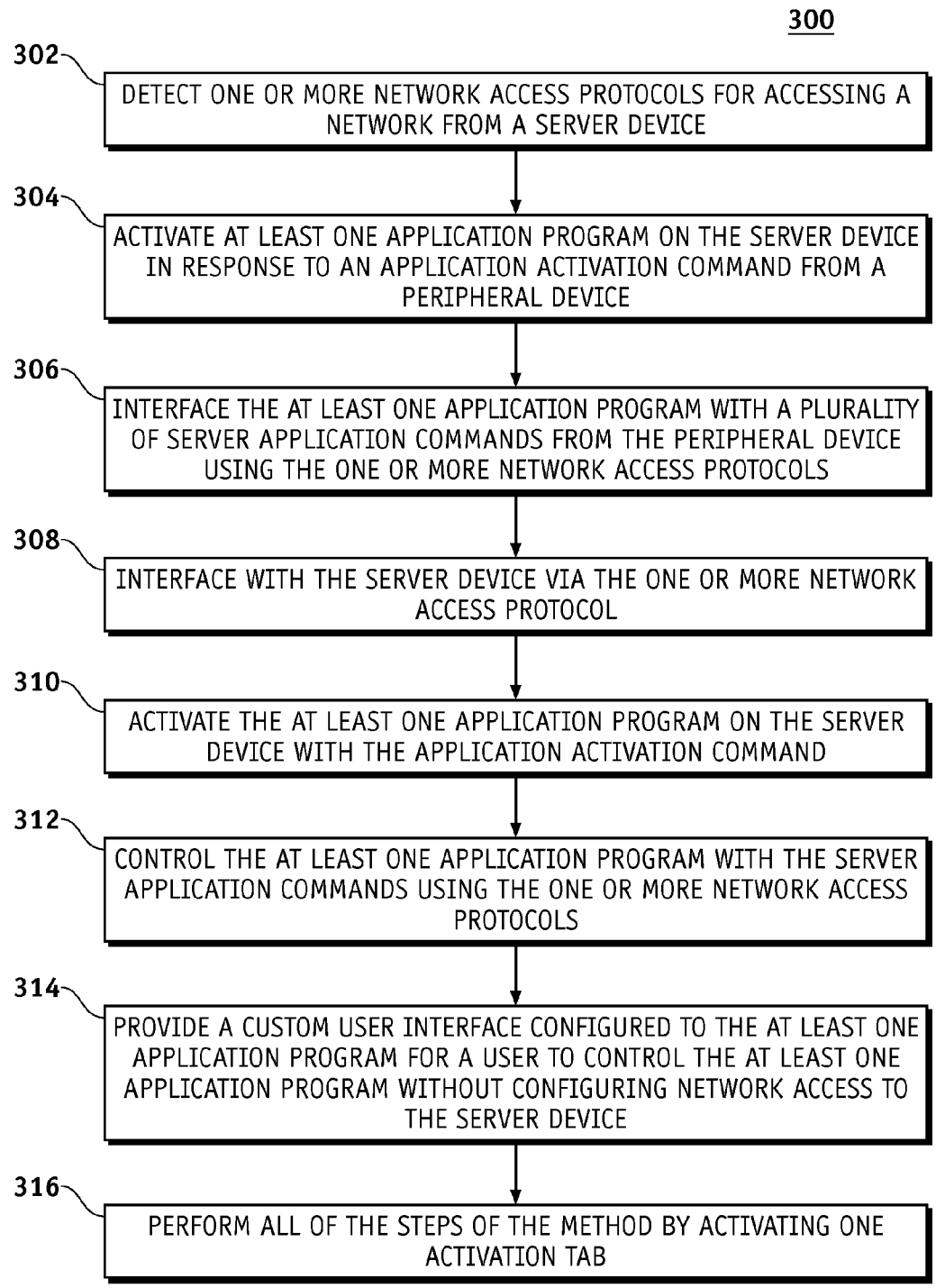
FIG. 3 is an illustration of a flowchart showing an exemplary process for remote peripheral control according to an embodiment of the disclosure.
Figure 4:
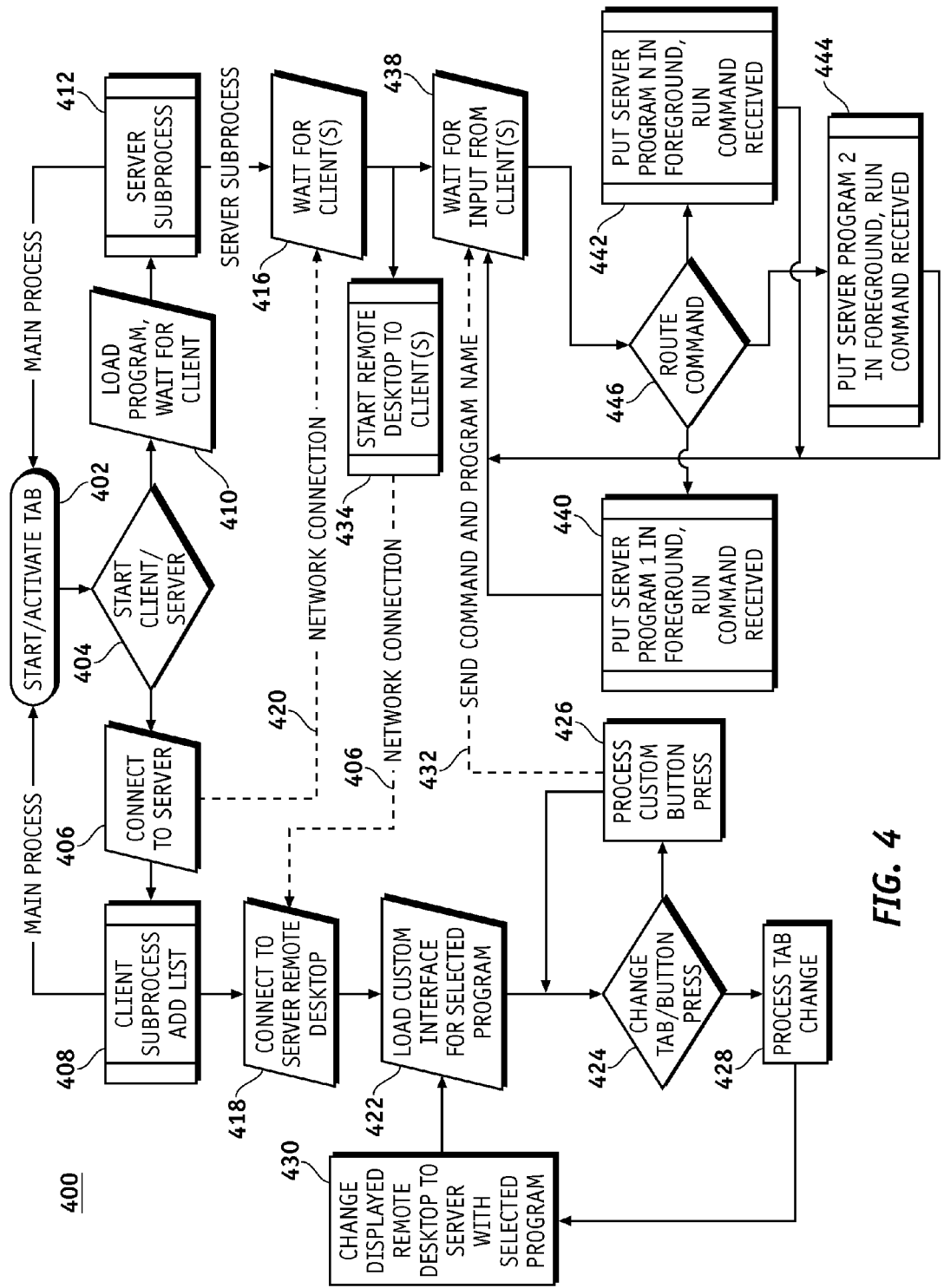
FIG. 4 is an illustration of a flowchart showing an exemplary process for remote peripheral control according to an embodiment of the disclosure.

FIGS. 3-4 are illustrations of flowcharts showing exemplary processes 300-400 for remote peripheral control according to an embodiment of the disclosure. The various tasks performed in connection with processes 300-400 may be performed by software, hardware, firmware, a computer-readable medium having computer executable instructions for performing the process method, or any combination thereof. The processes 300-400 may be recorded in a computer-readable medium such as a semiconductor memory, a magnetic disk, an optical disk, and the like, and can be accessed and executed, for example, by a computer CPU in which the computer-readable medium is stored.

It should be appreciated that processes 300-400 may include any number of additional or alternative tasks, the tasks shown in FIGS. 3-4 need not be performed in the illustrated order, and processes 300-400 may be incorporated into a more comprehensive procedure or process having additional functionality not described in detail herein. For illustrative purposes, the following description of processes 300-400 may refer to elements mentioned above in connection with FIG. 2.

In some embodiments, portions of processes 300-400 may be performed by different elements of the system 200 for remote peripheral control such as: the remote server interface control module 202 on the server device 116, the customized server device interface module 204 on the peripheral device 102, etc. Process 300 may have functions, material, and structures that are similar to the embodiments shown in FIG. 2. Therefore common features, functions, and elements may not be redundantly described here.

Process 300 may begin by detecting one or more network access protocols such as the network access protocols 206 for accessing a network such as the network 108 from a server device such as the server device 116 (task 302).

Process 300 may continue by activating at least one application program 114 on the server device 116 in response to an application activation command such as the application activation command 210 from a peripheral device such as the peripheral device 104/106 (task 304).

Process 300 may continue by interfacing the at least one application program 114 with a plurality of server application commands such as the server application commands 212 from the peripheral device 104/106 using the one or more network access protocols 206 (task 306).

Process 300 may continue by interfacing with the server device 116 via the one or more network access protocols 206 (task 308).

Process 300 may continue by activating the at least one application program 114 on the server device 116 with the application activation command 210 (task 310).

Process 300 may continue by controlling the at least one application program 114 with the server application commands 212 using the one or more network access protocols 206 (task 312).

Process 300 may continue by providing a custom user interface such as the custom user interface 122 configured to the at least one application program 114 for a user such as the user 118 to control the at least one application program 114 without configuring network access to the server device 116 (task 314). Thereby, the user 118 need not perform complex and/or time consuming tasks to configure network access. Configuring network access may refer to, for example but without limitation, setting up network access, interfacing with communication protocols, interfacing with network protocols, configuring network access, configuring software, configuring communication protocols, configuring network protocols, interfacing with software layers, setting up remote login, inputting user identifications and passwords, accessing an operating system, interfacing with an operating system, controlling an operating system, or other network access.

Process 300 may continue by performing all of the steps 302-314 of the process 300 by activating one activation tab 112 (task 316). Activating the activation tab 112 may be manually or automatically.

FIG. 4 is an illustration of a flowchart showing exemplary processes 400 for remote peripheral control according to an embodiment of the disclosure. As mentioned above, in response to "one click" of the activation tab 112 the system 200 may change the remote server such as the server device 116 that the remote device 104/106 (client) is (physically) plugged in to and communicatively couple the remote device 104/106 to another server device. In response to "one click" of the activation tab 112 the system 200 may change a foreground application program from among the application programs 114 on the remote computer 104/106 to an application program from among the application programs 114 that the activation tab 112 is configured for.

In operation, the user(s) 118 (FIG. 1) presses/activates (426/428) the activation tab 112 to provide an activation signal 126 (task 402).

In response to the activation signal 126 of the one activation tab 112: the client 104/106 and the server device 116 start/activate (task 404); a connection to the server device 116 is initiated to provide an initiated connection (task 406); a new remote session to the server device 116 is created in response to the initiated connection to provide a created new remote session (task 420); a remote session (client sub-process) is added to an active remote session list in response to the created new remote session (task 408); application program 114 is loaded (task 410); a remote desktop to the client 104/106 starts (task 434) and the client 104/106 connects to the server device 116 remote desktop (task 418); the custom user interface 122 is then loaded based on the application program 114 (task 422) configured for the activation tab 112; the application activation command 210 is sent to the server device 116 (task 432) to activate the application program 114 remotely; and the displayed remote desktop (e.g., displayed on the remote device 104/106) is switched to the server device 116 with the application program 114 remotely (task 430).

Multiple application programs 114 and remote computers 104/106 may be activated by multiple users 118 at substantially the same time. For example application programs 1–N (where N is integer) may be put in foreground (tasks 440, 442, and 444) in response to a corresponding activation of the activation tab 112 (task 424) through a router command (task 446). In this manner, multiple foreground application programs from among the application programs 114 are changed on the multiple remote computers 104/106 (clients) to the application programs 114 that the activation tab 112 is configured for.

It should be appreciated that process 400 may include any number of additional or alternative tasks such as adding client sub processes (e.g., task 408), sever sub process (e.g., task 412), waiting for clients (e.g., task 416), waiting for input from client (e.g., task 438) and other tasks suitable for operation of the system 200.

In this way, a system and a method are provided for switching between computers and application programs on a remote computer at a click of a tab and displaying a custom interface on the remote computer for the users of the selected application program.

In this document, the terms "computer program product", "computer-readable medium", and the like may be used generally to refer to media such as, for example, memory, storage devices, or storage unit. These and other forms of computer-readable media may be involved in storing one or more instructions for use by the processor module 222/234 to cause the processor module 222/234 to perform specified operations. Such instructions, generally referred to as "computer program code" or "program code" (e.g., which may be grouped in the form of computer programs or other groupings), when executed, enable the process 300.

While at least one exemplary embodiment has been presented in the foregoing detailed description, the disclosure is not limited to the above-described embodiment or embodiments. Variations may be apparent to those skilled in the art. In carrying out the disclosure, various modifications, combinations, sub-combinations and alterations may occur in regard to the elements of the above-described embodiment insofar as they are within the technical scope of the disclosure or the equivalents thereof. The exemplary embodiment or exemplary embodiments are examples, and are not intended to limit the scope, applicability, or configuration of the disclosure in any way. Rather, the foregoing detailed description will provide those skilled in the art with a template for implementing the exemplary embodiment or exemplary embodiments.

It should be understood that various changes can be made in the function and arrangement of elements without departing from the scope of the disclosure as set forth in the appended claims and the legal equivalents thereof. Furthermore, although embodiments of the disclosure have been described with reference to the accompanying drawings, it is to be noted that changes and modifications may be apparent to those skilled in the art. Such changes and modifications are to be understood as being comprised within the scope of the disclosure as defined by the claims.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIG. 2 depicts example arrangements of elements, additional intervening elements, devices, features, or components may be present in an embodiment of the disclosure.

Terms and phrases used in this document, and variations hereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items in the grouping be present, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A system, comprising:
   a server device, comprising a remote server interface control module that is configured to:
      receive a first application activation command from a peripheral device;
      after receiving the first application activation command, activate a first application program on the server device; and
      start a remote desktop as an interface to the first application program; and the peripheral device, comprising a customized server device interface module that is configured to:
      receive an indication that a first activation tab of the peripheral device has been activated, wherein the peripheral device is further configured to provide a plurality of activation tabs that comprise the first activation tab, and wherein each activation tab of the plurality of activation tabs is associated with an application program of a plurality of application programs that comprise the first application program;
      after receiving the indication that the first activation tab has been activated, send the first application activation command to the server device;
      after sending the first application activation command, connect to the remote desktop of the server device;
      load a custom user interface to the first application program from a database of the peripheral device, wherein the custom user interface is configured to change the interface to the first application program provided by the remote desktop; and
      provide the custom user interface to control the first application program.

2. The system of claim 1, wherein the peripheral device is further configured for network access using one or more network access protocols, and wherein the one or more network access protocols comprise a User Datagram Protocol (UDP), a Transmission Control Protocol (TCP), an Ethernet access protocol, an internet access protocol, or a combination thereof.

3. The system of claim 1, wherein the custom user interface comprises one of the first activation tab and a first activation button, and wherein the customized server device interface module is further configured to generate the application activation command after receiving an indication that the first activation button has been activated.

4. The system of claim 1, wherein the server device is configured to have the plurality of application programs activated at once, and wherein the remote server interface module is further configured to:
   receive a command associated with a particular application program of the plurality of application programs;
   change a foreground application program to the particular application program; and
   route the command to the foreground application program.

5. A method, comprising:
   receiving an indication that a first activation tab of a peripheral device has been activated;
   after receiving the indication that the first activation tab has been activated, sending a first application activation command from the peripheral device to a server device;
   after receiving the first application activation command, the server device activating a first application program;
   starting a remote desktop on the server device as an interface to the first application program;
   after sending the first application activation command, the peripheral device connecting to the remote desktop of the server device;
   loading, by the peripheral device, a custom user interface to the first application program from a database of the peripheral device, wherein the custom user interface is configured to change the interface to the first application program provided by the remote desktop, and wherein the peripheral device is further configured to provide a plurality of activation tabs that comprise the first activation tab, and wherein each activation tab of the plurality of activation tabs is associated with an application program of a plurality of application programs that comprise the first application program; and
   providing, by the peripheral device, the custom user interface to control the first application program.

6. The method of claim 5, wherein the peripheral device is further configured for network access using one or more network access protocols, and wherein the one or more network access protocols comprise a User Datagram Protocol (UDP), a Transmission Control Protocol (TCP), an Ethernet access protocol, an internet access protocol, or a combination thereof.

7. The method of claim 5, wherein the custom user interface comprises one of the first activation tab and a first activation button, and wherein the peripheral device is further configured to generate the application activation command after receiving an indication that the first activation button has been activated.

8. The method of claim 5, wherein the server device is configured to have the plurality of application programs activated at once, and wherein the method further comprises:

receiving, at the server device, a command associated with a particular application program of the plurality of application programs;

changing, by the server device, a foreground application program to the particular application program; and routing, by the server device, the command to the foreground application program.

9. The method of claim 5, further comprising:

after receiving the indication that the first activation tab of the peripheral device has been activated, initiating a network connection to the server device; after initiating the network connection, creating a remote session to the server device; and after creating the remote session, adding the remote session to an active remote session list of the peripheral device.

10. The method of claim 5, further comprising:

providing the peripheral device with a plurality of server application commands for controlling at least the first application program.

11. A non-transitory computer readable storage medium comprising computer-executable instructions that, when executed by a processor of a peripheral device, cause the peripheral device to perform operations comprising:

receiving an indication that a first activation tab has been activated;

after receiving the indication that the first activation tab has been activated, sending a first application activation command to activate a first application, wherein the peripheral device is configured to provide a plurality of activation tabs that comprise the first activation tab, and wherein each activation tab of the plurality of activation tabs is associated with an application program of a plurality of application programs that comprise the first application program;

after sending the first application activation command, connecting to a remote desktop, wherein the remote desktop is configured to provide an interface to the first application program;

loading a custom user interface to the first application program from a database of the peripheral device, wherein the custom user interface is configured to change the interface to the first application program provided by the remote desktop; and providing the custom user interface to control the first application program.

12. The non-transitory computer readable storage medium of claim 11, wherein the peripheral device is further configured for network access using one or more network access protocols, and wherein the one or more network access protocols comprise a User Datagram Protocol (UDP), a Transmission Control Protocol (TCP), an Ethernet access protocol, an internet access protocol, or a combination thereof.

13. The non-transitory computer readable storage medium of claim 11, wherein the custom user interface comprises one of the first activation tab and a first activation button, and wherein the customized server device interface module configured to generate the application activation command after receiving an indication that the first activation button has been activated.

14. The non-transitory computer readable storage medium of claim 11, wherein each activation tab of the plurality of activation tabs is configured to activate the application program associated with the activation tab.

15. The non-transitory computer readable storage medium of claim 14, wherein the operations further comprise:

providing a plurality of server application commands for controlling at least the first application program.

16. The non-transitory computer readable storage medium of claim 14, wherein the operations further comprise:

after receiving the indication that the first activation tab of the peripheral device has been activated, initiating a network connection;

after initiating the network connection, creating a remote session; and after creating the remote session, adding the remote session to an active remote session list.

17. The non-transitory computer readable storage medium of claim 11, wherein the operations further comprise:

accessing multiple application programs and remote computers simultaneously using the peripheral device.

18. The system of claim 1, wherein the plurality of application programs are executing on multiple computers.

19. The method of claim 5, wherein the plurality of application programs are executing on multiple computers.

20. The non-transitory computer readable storage medium of claim 11, wherein the plurality of application programs are executing on multiple computers.

* * * * *